May 27, 1930.  J. A. WRAY  1,760,224
SWIVEL
Filed Dec. 22, 1928  2 Sheets-Sheet 1
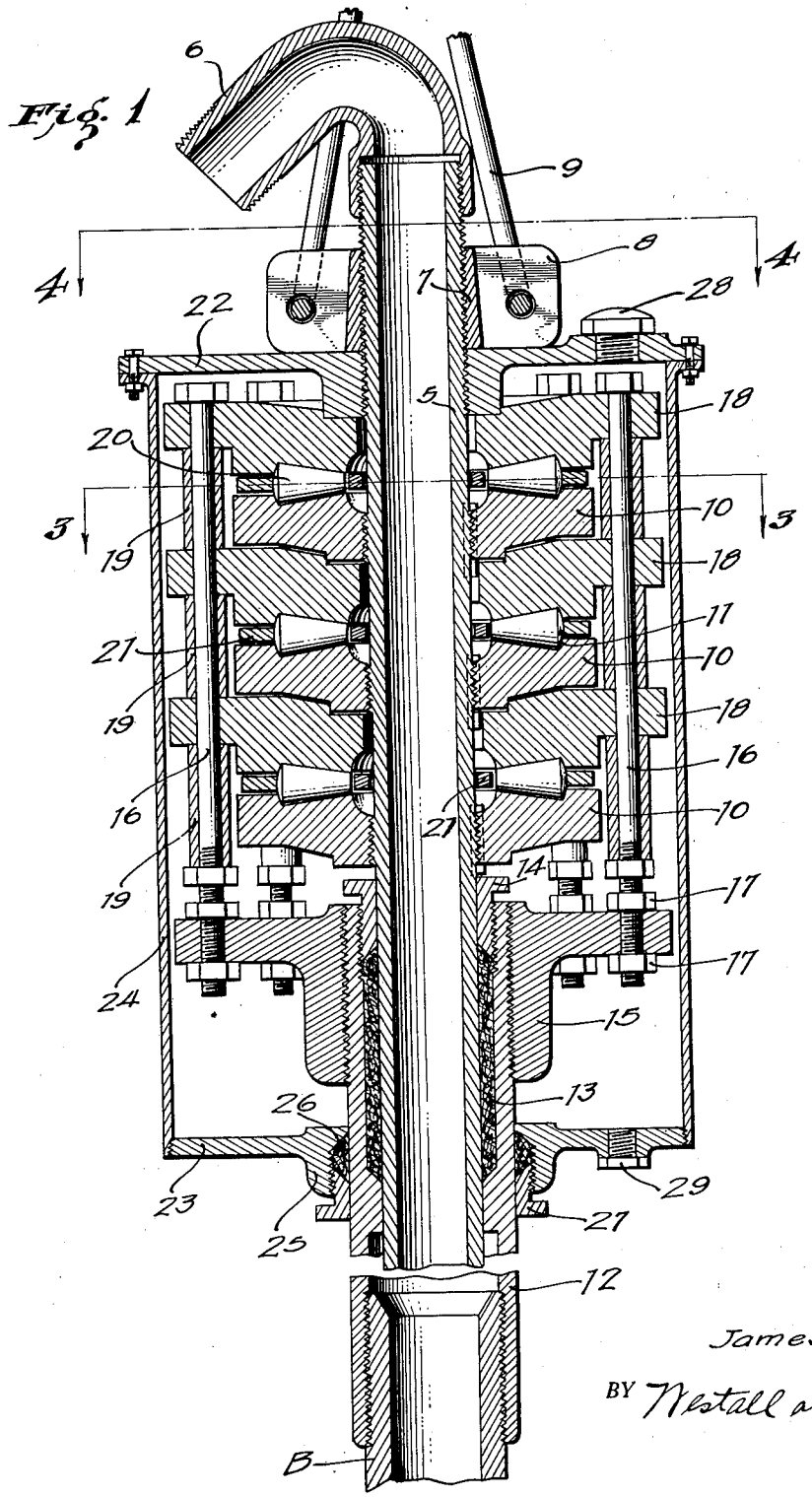
INVENTOR.
James A. Wray
BY Westall and Wallace
ATTORNEYS

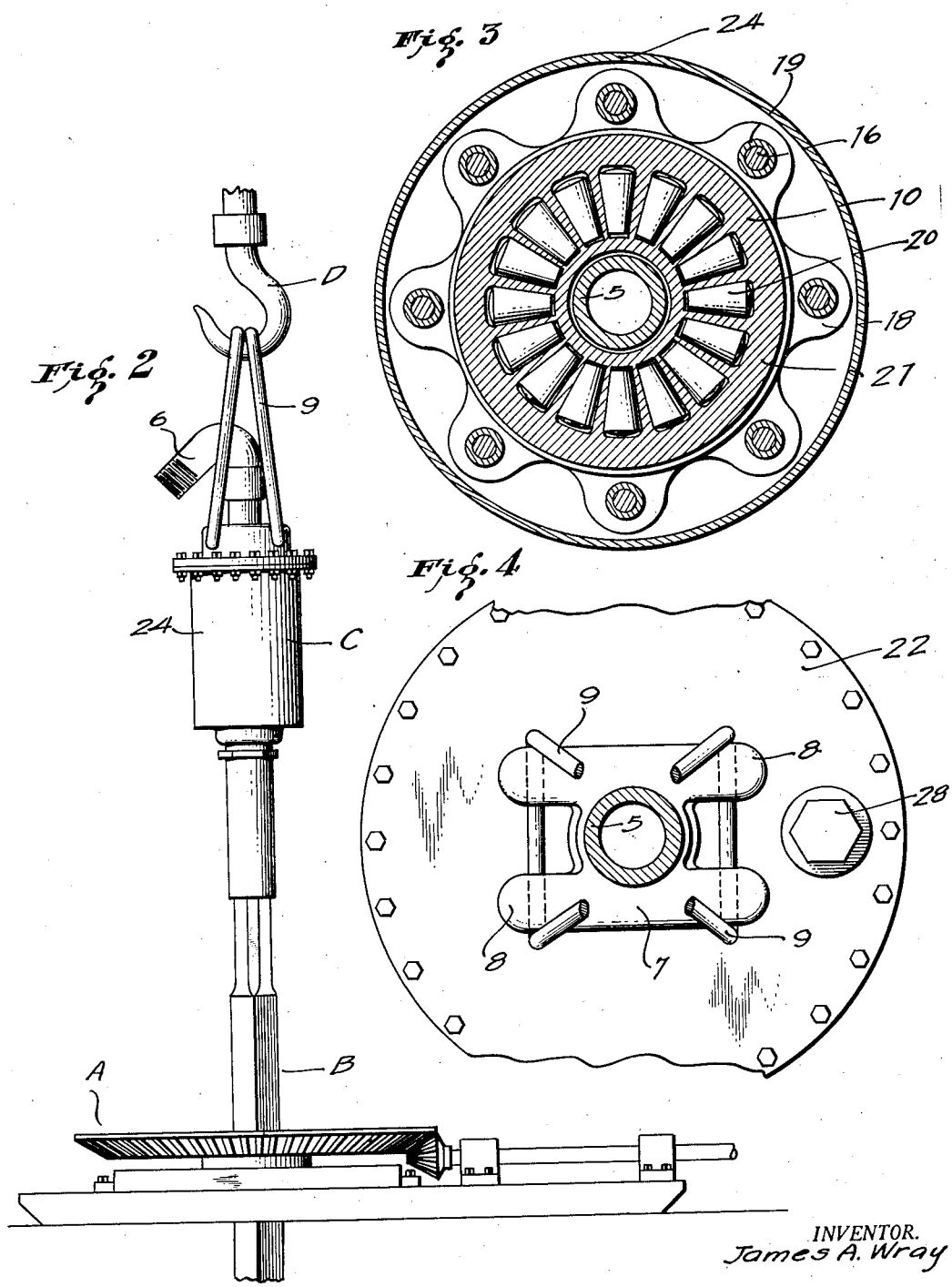

Patented May 27, 1930

1,760,224

UNITED STATES PATENT OFFICE

JAMES A. WRAY, OF LOS ANGELES, CALIFORNIA

SWIVEL

Application filed December 22, 1928. Serial No. 328,043.

This invention relates to a swivel used to support hollow drill stems employed in hydraulic rotary drilling of wells and serving as a coupling to the source of supply of circulation fluid. In such devices, a heavy load must be supported and a leak tight fit maintained between the rotating tubular member and the stationary tubular member to insure freedom of rotation, it is advantageous to employ anti-friction bearings. Roller bearings have been found to best serve the purpose because of their strength. However, a single group of roller bearings is hardly sufficiently strong to bear the thrust exerted on them; they wear unduly and frequently crush. Replacement of the swivel must then be effected with resultant loss in time and increase in labor. Circulation must be stopped while replacement is accomplished, and the stoppage of circulation is often attended by sticking commonly termed "freezing" of tools, pipes, casing and other parts due to settling of cuttings.

The objects of this invention are: first, to provide a swivel having a multiplicity of groups of rollers so disposed as to distribute the load between groups; second, to provide an encased system of races and rollers so that they may travel in a bath of lubricant;
and third, to provide means for adjusting the races and packing glands with a minimum of manipulation. In addition to the broader objects of this invention there are certain details of design contributing to simplicity, compactness, strength and durability.

These objects together with other objects and corresponding accomplishments are obtained by means of the embodiment of my invention illustrated in the accompanying drawings, in which:—

Fig. 1 is a vertical section through a swivel; Fig. 2 is an elevation of a rotary table; drill stem and swivel in assembled relation; and Figs. 3 and 4 are sections as seen on the lines correspondingly numbered in Fig. 1.

Referring more particularly to Fig. 2, A indicates generally a rotary table through which a drill drive stem B passes. The drive stem and parts depending therefrom are supported by a swivel indicated generally by C, the swivel being suspended from a hook D.

The swivel comprises a tubular member 5 threaded at the upper end and intermediate the ends. A goose neck 6 is secured to the tubular member 5. Threaded on the tubular member 5 is a collar 7 having ears 8 with apertures for bails 9. These bails serve for suspending the swivel upon hook D. The goose neck 6 is adapted to be connected to a hose leading from a source of supply of circulation fluid such as a mud pump.

Threaded upon the tube 5 are disks 10, three being shown herein and forming races for rollers. The grooves for the rollers are indicated by 11. Obviously, the races 10 may be adjusted longitudinally of the tube 5. The drive stem B is secured to a tubular member 12 and is of such internal diameter as to slidingly receive the tubular member 5. A packing recess is formed in member 12 and filled with packing 13 held in position by a gland 14. It will be noted that packing 13 is relatively long so that fluid would be compelled to travel for a considerable distance in order to pass around the packing. The tubular member 12 is externally threaded and mounted thereon is a head 15 having peripherally spaced holes to receive rods 16. The rods are secured to the head by nuts 17 so as to be adjustable. Disposed about the tubular member 5 and free thereof are races 18 having grooves to cooperate with the grooves in races 10. Each of the races 18 has ears with openings for the passage therethrough of the rods 16. Spacing sleeves 19 are mounted upon the rods and intermediate the adjacent races 18. Mounted in the race ways between pairs of races are tapered rollers 20 and disk cages 21 serve to separate the rollers.

It will be noted that the load suspended from the tubular member 12 is transmitted to tubular member 5 by means of three sets of roller bearings, thereby distributing the load. In order to lubricate the bearing, I have provided a casing comprising heads 22 and 23 and a cylindrical wall 24. Head 22 is secured to tubular member 5 and head 23 is rotatably free of tubular member 12. Member 12 has a boss 25 provided with packing recess in which is disposed a packing 26. A gland 27 holds the packing in place. A stuffing box is thus formed to prevent leakage of lubricant from the casing. In the head 22 is a filler opening closed by a plug 28 and in the head 23 is a drain opening closed by a plug 29. Circulation fluid is introduced into the tubular members under a high pressure. The long packing 13 will effectively prevent leakage of the circulation fluid into the chamber within the casing. However, should any fluid leak, it will pass into the casing and would still have to be forced through the packing 26 so that a double seal is formed.

It is obvious that the structure has freedom of rotary movement because of the roller bearings and the lubricant. Furthermore the thrust is distributed between several sets of roller bearings.

What I claim is:—

1. A swivel comprising a tubular member adapted to be connected to a source of fluid supply, a tubular member adapted to support a load rotatably connected to said first mentioned member by means of a plurality of pairs of coacting roller races, one member of each pair of races being secured to one of said tubular members and the other member of each pair of races being secured to the other tubular member to provide alternate connections to said tubular members in seriatim, and rollers disposed between the members of each pair of races whereby to provide multiple sets of roller bearings, all acting together for resisting relative longitudinal movement of said tubular members.

2. A swivel comprising a tubular member adapted to be connected to a source of fluid supply, a tubular member adapted to support a load rotatably connected to said first mentioned member by means of a plurality of pairs of coacting roller races, one member of each pair of races being threadedly secured to one of said tubular members to provide for longitudinal adjustment thereon, the other member of each of said pairs of races being secured to the other tubular member to provide alternate connections to said tubular members in seriatim, and rollers disposed between the members of each pair of races whereby to provide multiple sets of roller bearings, all acting together for resisting relative longitudinal movement of said tubular members.

3. A swivel comprising a tubular member adapted to be connected to a source of fluid supply, a tubular member adapted to support a load rotatably connected to said first mentioned member by means of a plurality of pairs of coacting roller races, one member of each pair of races being secured to one of said tubular members, a head secured to the other of said tubular members at one end of the races, rods extending from said head and embracing said races, the other members of said pairs of races being mounted on said rods and supported thereon against longitudinal movement, and rollers between the members of the pairs of races whereby to provide multiple sets of roller bearings, all resisting relative longitudinal movement of said tubular members.

4. A swivel comprising a tubular member adapted to be connected to a source of fluid supply, a tubular member adapted to support a load rotatably connected to said first mentioned member by means of a plurality of pairs of coacting roller races, one member of each pair of races being threadedly secured to one of said tubular members to provide for longitudinal adjustment thereon, a head secured to the other of said tubular members at one end of the races, rods extending from said head and embracing said races, the other members of said pairs of races being mounted on said rods and supported thereon against longitudinal movement, and rollers between the members of the pairs of races whereby to provide multiple groups of roller bearings, all resisting relative longitudinal movement of said tubular members.

5. A swivel comprising a tubular member adapted to be connected to a source of fluid supply, a tubular member adapted to support a load rotatably connected to said first mentioned member by means of a plurality of pairs of coacting roller races, one member of each pair of races being secured to one of said tubular members, a head threadedly secured to the other of said tubular members at one end of the races for longitudinal adjustment thereon, rods extending from said head and embracing said races, spacing sleeves mounted on said rods and interposed between the other members of said pairs of races to support the latter thereon, and rollers between the members of said pairs of races whereby to provide multiple sets of roller bearings, all resisting relative longitudinal movement of said tubular members.

6. A swivel comprising a tubular member adapted to be connected to a source of fluid supply, a tubular member adapted to support a load rotatably connected to said first mentioned member by means of a plurality of pairs of coacting roller races, one member of each pair of races being threadedly secured to one of said tubular members to provide for longitudinal adjustment thereon, a head threadedly secured to the other of said tubular members at one end of the races for longitudinal adjustment thereon, rods extending from said head and embracing said races, spacing sleeves mounted on said rods and interposed between the other members of said pairs of races to support the latter thereon, and rollers between the members of said pairs of races whereby to provide multiple sets of roller bearings, all resisting relative longitudinal movement of said tubular members.

7. A swivel comprising a tubular member adapted to be connected to a source of fluid supply, a tubular member adapted to support a load rotatably connected to said first mentioned member by means of a plurality of pairs of coacting roller races, one member of each pair of races being secured to one of said tubular members, a head threadedly secured to the other of said tubular members at one end of the races for longitudinal adjustment thereon, rods extending from said head and connected thereto for longitudinal adjustment, spacing sleeves mounted on said rods and interposed between the other members of said pairs of races to support the latter thereon, and rollers between the members of said pairs of races whereby to provide multiple sets of roller bearings, all resisting relative longitudinal movement of said tubular members.

8. A swivel comprising a tubular member adapted to be connected to a source of fluid supply, a tubular member adapted to support a load rotatably connected to said first mentioned member by means of a plurality of pairs of coacting roller races, one member of each pair of races being threadedly secured to one of said tubular members to provide for longitudinal adjustment thereon, a head threadedly secured to the other of said tubular members at one end of the races for longitudinal adjustment thereon, rods extending from said head and connected thereto for longitudinal adjustment, spacing sleeves mounted on said rods and interposed between the other members of said pairs of races to support the latter thereon, and rollers between the members of said pairs of races whereby to provide multiple sets of roller bearings, all resisting relative longitudinal movement of said tubular members.

9. A swivel comprising a tubular member adapted to be connected to a source of fluid supply, a tubular member adapted to support a load rotatably connected to said first mentioned member by means of a plurality of pairs of coacting roller races, one member of each pair of races being secured to one of said tubular members, a head secured to the other of said tubular members at one end of the races, rods extending from said head and connected thereto for longitudinal adjustment, the other members of said pairs of races being mounted on said rods and supported thereon against longitudinal movement, and rollers between the members of the pairs of races whereby to provide multiple sets of roller bearings, all resisting relative longitudinal movement of said tubular members.

10. A swivel comprising a tubular member adapted to be connected to a source of fluid supply, a tubular member adapted to support a load rotatably connected to first mentioned member by means of a plurality of pairs of coacting roller races, one member of each pair of races being threadedly secured to one of said tubular members to provide for longitudinal adjustment thereon, a head secured to the other of said tubular members at one end of the races, rods extending from said head and connected thereto for longitudinal adjustment, the other members of said pairs of races being mounted on said rods and supported thereon against longitudinal movement, and rollers between the members of the pairs of races whereby to provide multiple sets of roller bearings, all resisting relative longitudinal movement of said tubular members.

11. A swivel comprising a tubular member adapted to be connected to a source of fluid supply, a tubular member adapted to support a load rotatably connected to first mentioned member by means of a stuffing box packing the joints between said members, a plurality of pairs of coacting roller races, one member of each pair of races being secured to one of said tubular members, a head secured to the other of said tubular members at one end of the races, rods extending from said head and embracing said races, the other members of said pairs of races being mounted on said rods and supported thereon against longitudinal movement, and rollers between the members of the pairs of races whereby to provide multiple sets of roller bearings, all resisting relative longitudinal movement of said tubular members and a casing for lubricants enclosing said bearings and said stuffing box.

12. A swivel comprising a tubular member adapted to be connected to a source of fluid supply, a tubular member adapted to support a load rotatably connected to first mentioned member by means of a stuffing box packing the joints between said members, a plurality of pairs of coacting roller races, one member of each pair of races being secured to one of said tubular members, a head threadedly secured to the other of said tubular members at one end of the races for longitudinal adjustment thereon, rods extending from said head and embracing said races, spacing sleeves mounted on said rods interposed between the other members of said pairs of races to support the latter thereof, rollers between the members of said pairs of races whereby to provide multiple sets of roller bearings, all resisting relative longitudinal movement of said tubular members, and a casing for lubricants enclosing said bearings and said stuffing box.

13. A swivel comprising a tubular member adapted to be connected to a source of fluid supply, a tubular member adapted to support a load rotatably connected to said first mentioned member by means of a stuffing box packing the joints between said members, a plurality of pairs of coacting roller races, one member of each pair of races being secured to one of said tubular members and the other member of each pair of races being secured to the other tubular member, rollers disposed between the members of each pair of races whereby to provide multiple groups of roller bearings, all resisting relative longitudinal movement of said tubular members, a casing for lubricant secured to one of said tubular members and enclosing said bearings and stuffing box, and a second stuffing box on said casing packing the latter and the other tubular members.

14. A swivel comprising a tubular member adapted to be connected to a source of fluid supply, a tubular member adapted to support a load rotatably connected to said first mentioned member by means of a stuffing box packing the joints between said members, a plurality of pairs of coacting roller races, one member of each pair of races being secured to one of said tubular members, a head secured to the other of said tubular members at one end of the races, rods extending from said head and embracing said races, the other members of said pairs of races being mounted on said rods and supported thereon against longitudinal movement, rollers between the members of the pairs of races whereby to provide multiple sets of roller bearings all resisting relative longitudinal movement of said tubular members, a casing for lubricant secured to said first mentioned member and enclosing said bearings and said stuffing box, and a second stuffing box on said casing packing the latter and the last mentioned tubular member.

In witness that I claim the foregoing I have hereunto subscribed my name this 17th day of December, 1928.

JAMES A. WRAY.